United States Patent [19]

Frankenhauser et al.

[11] Patent Number: 5,468,907
[45] Date of Patent: Nov. 21, 1995

[54] ELECTRICAL CONDUCTOR WITH A LONGITUDINAL GROOVE AND SLOTS PERPENDICULAR THERETO AND A METHOD FOR PRODUCING THE SAME

[75] Inventors: Georg Frankenhauser; Erhard Wedemann, both of Mülheim a.d. Ruhr, Germany

[73] Assignee: Siemens Aktiengesellschaft, Munich, Germany

[21] Appl. No.: 355,977

[22] Filed: Dec. 14, 1994

Related U.S. Application Data

[62] Division of Ser. No. 145,465, Oct. 29, 1993, which is a continuation of PCT/DE92/00252, Mar. 27, 1992.

[30] Foreign Application Priority Data

Apr. 29, 1991 [DE] Germany .................... 41 14 003.6

[51] Int. Cl.⁶ .................................................. H01B 7/34
[52] U.S. Cl. ...................... 174/15.6; 174/16.2; 174/68.2; 310/64
[58] Field of Search ................... 174/15.6, 16.1, 174/16.2, 133 B, 129 B, 99 B, 88 B, 72 B, 71 B, 70 B, 149 B, 68.2

[56] References Cited

U.S. PATENT DOCUMENTS

| | | | |
|---|---|---|---|
| 2,755,395 | 7/1956 | Kilner | 310/64 |
| 2,903,609 | 9/1959 | Waddington | 310/64 |
| 3,119,033 | 1/1969 | Horsley et al. | 310/64 |
| 4,152,610 | 5/1979 | Wellenstein | 310/59 |
| 5,119,058 | 6/1992 | Baddi et al. | 336/62 |

FOREIGN PATENT DOCUMENTS

| | | | |
|---|---|---|---|
| 160887 | 8/1990 | European Pat. Off. . | |
| 1414669 | 9/1965 | France . | |
| 1418960 | 10/1965 | France . | |
| 1015528 | 9/1957 | Germany . | |
| 1036370 | 8/1958 | Germany . | |
| 1242744 | 6/1967 | Germany . | |
| 1438335 | 2/1969 | Germany . | |
| 513910 | 2/1955 | Italy | 174/15.6 |
| 323125 | 8/1957 | Switzerland . | |
| 329882 | 6/1958 | Switzerland . | |
| 724506 | 2/1955 | United Kingdom . | |
| 735142 | 8/1955 | United Kingdom | 310/64 |
| 868467 | 5/1961 | United Kingdom . | |

OTHER PUBLICATIONS

Publication by D. Lambrecht, pp. 176–177, "Lauferentwicklung fur Turbogenetor" Publication by R. Knobloch, pp. 1–4, Leitwerkstoffe (Conductor Materials).

*Primary Examiner*—Morris H. Nimmo
*Attorney, Agent, or Firm*—Herbert L. Lerner; Laurence A. Greenberg

[57] ABSTRACT

An electrical conductor assembly includes a plurality of identical conductors having a longitudinal direction and a stacking direction perpendicular thereto. At least one insulating layer is to be inserted between each two respective conductors and stacked therewith in the stacking direction. Each of the conductors has two substantially flat main sides oriented perpendicular to the stacking direction and a maximum thickness in the stacking direction. Each of the conductors has at least one set of slots in succession approximately in the longitudinal direction. Each of the slots leads approximately in the stacking direction through a respective one of the conductors and has a sharp-edged mouth in each of the main sides. At least one of the main sides of each of the conductors has a longitudinal groove being associated with the set of slots, being oriented approximately parallel to the longitudinal direction, defining two groove walls approximately parallel to the stacking direction, defining a groove bottom approximately perpendicular to the stacking direction and having a groove depth as measured in the stacking direction being small relative to the maximum thickness. The mouth in the main side at each of the slots is spaced apart from each of the groove walls in the groove bottom. An embodiment with only one conductor and no insulating layer as well as a method of production and a winding for a dynamo-electric machine are also provided.

26 Claims, 2 Drawing Sheets

ELECTRICAL CONDUCTOR WITH A LONGITUDINAL GROOVE AND SLOTS PERPENDICULAR THERETO AND A METHOD FOR PRODUCING THE SAME

CROSS-REFERENCE TO RELATED APPLICATION

This application is a division of U.S. patent application Ser. No. 08/145,465, filed Oct. 29, 1993, which is a Continuation of International Application Ser. No. PCT/DE92/00252, filed Mar. 27, 1992.

BACKGROUND OF THE INVENTION

FIELD OF THE INVENTION

The invention relates to an electrical conductor having a longitudinal direction and a stacking direction perpendicular to the longitudinal direction, which can be stacked with a plurality of identical conductors with the interposition of an insulating layer between each two adjacent conductors, the conductor having two substantially flat main sides oriented perpendicular to the stacking direction and having at least a set or multiplicity of slots being disposed in succession approximately in the longitudinal direction, each leading approximately in the stacking direction through the conductor and having a mouth in each main side.

Such electrical conductors find many uses in windings of electrical machines, particularly in the windings of turbo generators that are cooled with a coolant gas, in particular air or hydrogen, in order to dissipate the heat produced during operation. Electrical conductors of that type, like their use in the windings of electric machines, are described in a book entitled "Herstellung der Wicklungen Elektrischer Maschinen" [Manufacture of the Windings of Electrical Machines], edited by H. Sequenz, Springer Verlag, Vienna and New York 1973, particularly in an article by D. Lambrecht contained in that book and entitled "Läuferwicklungen für Turbogeneratoren" [Rotor Windings for Turbogenerators] (page 169 ff.). In order to select the material for an electrical conductor of the type described, reference may be made in particular to an article that is also contained in that book, entitled "Leiterwerkstoffe" [Conductor Materials] by R. Knobloch (page 1 ff.). An example of the use of an electrical conductor of that kind may be found in European Patent No. 0 160 887 B1.

As described in detail particularly in the article by D. Lambrecht, electrical conductors of the type described are typically stacked one above the other in a stacking direction perpendicular to the longitudinal directions of the electrical conductors in order to form a winding for an electrical machine, optionally using intermediate insulating layers. Slots in electric conductors and insulating layers that are adjacent to one another are made to overlap at least partially with one another, so that they communicate among one another to form cooling conduits leading through the stacked electrical conductors. The cooling conduits are oriented substantially parallel to a plane defined by the mutually parallel longitudinal directions and by the stacking direction. During operation of the winding, the cooling conduits are flooded with coolant gas, in particular air or hydrogen, as is explained in detail in the references cited.

German Published, Prosecuted Application DE-AS 1 242 744 and German Patent DE-PS 1 242 744 describe an electrical conductor with a longitudinal direction and a stacking direction perpendicular to the longitudinal direction, which can be stacked with a plurality of identical conductors in the stacking direction, and in which at least one insulating layer is to be inserted between each two conductors. The conductor is defined by two substantially flat main sides being oriented perpendicular to the stacking direction and having a set of slots, which are disposed in succession approximately in the longitudinal direction and each of which leads in the stacking direction through the conductor and has a sharp-edged mouth in each main side. At boundary edges, each slot has groove-like milled cuts, which are filled by bush-like adapter pieces of insulating material when this conductor is stacked together with other conductors.

U.S. Pat. No. 4,152,610 discloses a stackable electrical conductor with a set of slots that lead in a stacking direction through the conductor which has a longitudinal groove, oriented parallel to a longitudinal direction of the conductor, for forming a coolant conduit.

German Published, Non-Prosecuted Application DE-OS 1 438 335 describes a stack of electrical conductors being insulated from one another by insulating layers with slots oriented in the stacking direction, in which a slot of a conductor communicates with a slot of an adjacent conductor through a conduit oriented at an angle to a common longitudinal direction of the conductors. Such a conduit may be made in the insulation and/or in one of the conductors.

When the slots are produced in the electrical conductors, special care and therefore in accordance with current practice expensive post-machining of the stamped or milled slots is necessary, as is explained in detail in the article by D. Lambrecht cited above, among other sources, in order to avoid undesired electrical connections in the form of short circuits and the like between two electrical conductors resting on one another and between which there is only a thin insulating layer. Therefore, conventionally the mouths of the slots must be deburred and rounded off or beveled by subsequent countersinking, embossing or the like, which despite the attendant effort and especially the attendant expense is considered too important to be omitted.

SUMMARY OF THE INVENTION

It is accordingly an object of the invention to provide an electrical conductor with a longitudinal groove and slots perpendicular thereto and a method for producing the same, which overcome the hereinafore-mentioned disadvantages of the heretofore-known devices and methods of this general type, in which the electrical conductor can be produced easily and economically and which makes expensive post-machining to remove burrs and further forming of mouths of the slots unnecessary.

With the foregoing and other objects in view there is provided, in accordance with the invention, an electrical conductor assembly, comprising a plurality of identical conductors having a longitudinal direction and a stacking direction perpendicular to the longitudinal direction; at least one insulating layer to be inserted between each two respective conductors and stacked with the conductors in the stacking direction; each of the conductors having two substantially flat main sides oriented perpendicular to the stacking direction and having a maximum thickness in the stacking direction; each of the conductors having at least one set of slots formed therein in succession approximately in the longitudinal direction, each of the slots leading approximately in the stacking direction through a respective one of the conductors and having a sharp-edged mouth in each of the main sides; and at least one of the main sides of each of the conductors having a longitudinal groove formed therein, being associated with the set of slots, being oriented approximately parallel to the longitudinal direction, defining two groove walls disposed approximately parallel to the stacking direction, defining a groove bottom disposed approximately perpendicular to the stacking direction and having a groove depth as measured in the stacking direction being small relative to the maximum thickness, and the mouth formed in the main side at each of the slots being spaced apart from each of the groove walls in the groove bottom.

In the electrical conductor according to the invention, the mouths of all of the slots are left as sharp-edged as possible with conventional manufacturing methods in the form of stamping or milling, or at least in connection with simple material-removing surface treatments in the form of sandblasting or brushing with bristles. Rounding off or beveling the mouths by countersinking, milling, embossing or the like is unnecessary. The insulation between two adjacent conductors between which there is merely an insulating layer (optionally in multiple parts), which has recesses or the like that correspond with the slots of the conductors, is assured by means of a longitudinal groove located in at least one of the conductors, having the properties according to the invention, by which the mouths of the slots of this conductor are spaced apart from the insulating layer. A creep path that is adequately long for the quality of the insulation, or in other words for the electrical strength, between the two conductors, can be assured without expensive post-machining.

In accordance with another feature of the invention, the groove depth of the longitudinal groove according to the invention is kept relatively low with a groove depth of at most approximately 20%, and preferably at most approximately 10%, of the maximum thickness of the conductor, wherein a groove depth on the order of magnitude of approximately 1 mm, and namely between 0.5 mm and 2 mm and in particular about 1 mm, is adequate for typical applications. Therefore the invention does not require any substantial reduction in the cross section of an electrical conductor for typical applications.

The maximum groove width of the longitudinal groove according to the invention in the main side of the conductor may be dimensioned in such a way that while an adequately long creep path is maintained, sacrifices of the cross section for conducting the electric current are especially slight. In accordance with a further feature of the invention, in the context of typical applications, the maximum groove width may be dimensioned in such a way that the maximum slot width of each of the slots with which the longitudinal groove is associated amounts to at most approximately 80% of the maximum groove width. As a rule, a maximum groove width that is between approximately 0.5 mm and approximately 2 mm, and in particular about 1 mm, greater than the maximum slot width represents a preferred embodiment of the invention.

In accordance with an added feature of the invention, each set of slots has only one longitudinal groove, or in particular one longitudinal groove on only one main side, associated with it. Thus while all of the advantages of the invention are largely preserved, the cross-sectional sacrifices for the electrical conductor can be kept slight, and the electrical loading capacity of the electrical conductor can be increased considerably.

In accordance with an additional feature of the invention, only one set of slots is provided in the electrical conductor of the invention, or in other words only one row of slots located approximately one after the other in the longitudinal direction. This is especially valuable for the sake of inexpensive production and also advantageously affects the attainment of a high cross section, with given demands for coolability by coolant gas that flows through the slots.

In accordance with yet another feature of the invention, the electrical conductor of the invention is made flat, has a maximum width perpendicular to the longitudinal direction and perpendicular to the stacking direction, and the width is greater than the maximum thickness to be measured parallel to the stacking direction. A ratio of maximum width to maximum thickness of between 5 and 10 has proved to be advantageous.

An essential advantage of the invention is that sharp-edged contours, possibly with slight residues of burrs, at the mouths of the slots, are tolerated. In electrical conductors of the prior art that was flatly not possible. Remachining of the electrical conductor after the slots have been made need not necessarily round off each mouth. with a radius of curvature that is above a certain limit value, or eliminate every single burr completely. However, it is useful if the maximum burr height of any burrs that remain at the slots is less than the groove depth of the longitudinal groove associated with the slots. In this way, the burrs remaining at the mouths cannot in any way impair the adjacent conductors and/or insulating layers. In an electrical conductor according to the invention, the maximum burr height should be less than 0.5 mm, and preferably less than 0.3 mm. Maximum burr heights of this order of magnitude can moreover be achieved without difficulty by simply retreating the electrical conductor after the slots have been made, for instance by sandblasting.

With the objects of the invention in view, there is also provided a method of producing an electrical conductor, which comprises first making the longitudinal groove in the conductor and then stamping out the slots.

In accordance with another mode of the invention, there is provided a method which comprises making the longitudinal groove by deep-drawing, rolling or compression molding, in particular directly in the process of producing the conductor from a suitable blank.

In accordance with a further mode of the invention, there is provided a method which comprises stamping each slot into the conductor by piercing the conductor with a stamping tool from the groove bottom of the longitudinal groove to the main side opposite it. In this way, a simple flat plate or the like may be used as a support for the conductor to be stamped. There is no danger that the electrical conductor will be bent in the stamping process.

In accordance with an added mode of the invention, there is provided a method which comprises concluding the production of the conductor with a material-removing surface treatment, particularly a blasting treatment on the order of sandblasting. This surface treatment reliably eliminates any particles loosely sticking to the surface, effects removal of any burrs that might be present to the extent necessary for the purposes of the invention, and nevertheless can be carried out especially simply and economically.

With the objects of the invention in view, there is additionally provided an electrical conductor winding for a dynamoelectric machine, for instance for a turbo generator, comprising a plurality of identical conductors stacked with a plurality of insulating layers each having a set of recesses, in alternation in the stacking direction, each recess communicating with at least one slot in each of the conductors adjacent to the insulating layer, and at least one conductor resting with a main side having a longitudinal groove, on each insulating layer. Optimal use is thus made of the advantages of the conductor of the invention.

In accordance with another feature of the invention, only one conductor, with a main side having a longitudinal groove, is placed on each insulating layer. This makes it possible to use conductors that are provided with at least one longitudinal groove on only one side and thus can carry especially heavy electrical loads.

In accordance with a further feature of the invention, when the electrical conductor of the invention is used to produce a winding for a dynamo-electric machine, each recess in each insulating layer is substantially coincident with at least one slot with which it communicates. In this way an especially long creep path can be attained, which is advantageous for increasing the electrical capacity of the winding. Windings that are produced by using electrical conductors according to the invention are especially suitable for use as rotor windings in turbo generators, and in particular turbo generators with rated capacities of up to approximately 300 MVA.

With the objects of the invention in view, there is furthermore provided an electrical conductor, comprising a basic body having a longitudinal direction and a coolant flow direction perpendicular to the longitudinal direction; the basic body having two substantially flat main sides oriented perpendicular to the coolant flow direction and a maximum thickness in the coolant flow direction; the basic body having at least one set of slots formed therein in succession approximately in the longitudinal direction, each of the slots leading approximately in the coolant flow direction through the basic body and having a sharp-edged mouth in each of the main sides; and at least one of the main sides having a longitudinal groove formed therein, being associated with the set of slots, being oriented approximately parallel to the longitudinal direction, defining two groove walls disposed approximately parallel to the coolant flow direction, defining a groove bottom disposed approximately perpendicular to the coolant flow direction and having a groove depth as measured in the coolant flow direction being small relative to the maximum thickness, and the mouth formed in the main side at each of the slots being spaced apart from each of the groove walls in the groove bottom.

In accordance with another feature of the invention, in this embodiment as well, the groove depth is at most approximately 20% and preferably at most approximately 10% of the maximum thickness and may be between 0.5 mm and 2 mm and preferably approximately 1 mm.

In accordance with a further feature of the invention, when only one conductor is provided according to the invention, each of the slots has a maximum slot width and each of the longitudinal grooves has a maximum groove width, perpendicular to the longitudinal direction and perpendicular to the coolant flow direction; and the maximum slot width is at most approximately 80% of the maximum groove width, or the maximum groove width is between 0.5 mm and 2 mm larger than the maximum slot width, or preferably the maximum groove width is approximately 1 mm larger than the maximum slot width.

In the embodiment with only one conductor, in accordance with an added feature of the invention, only one longitudinal groove is associated with each set of slots. In accordance with an additional feature of the invention, the at least one set of slots is only one set of slots. In accordance with yet another feature of the invention, the basic body has a maximum width being greater than the maximum thickness, perpendicular to the longitudinal direction and perpendicular to the coolant flow direction.

With the objects of the invention in view, there is also provided a for producing an electrical conductor having a basic body with a longitudinal direction and a coolant flow direction perpendicular to the longitudinal direction, the basic body having two substantially flat main sides oriented perpendicular to the coolant flow direction and having a maximum thickness in the coolant flow direction; which comprises initially forming a longitudinal groove in at least one of the main sides of the basic body, the longitudinal groove being oriented approximately parallel to the longitudinal direction, defining two groove walls disposed approximately parallel to the coolant flow direction, defining a groove bottom disposed approximately perpendicular to the coolant flow direction and having a groove depth as measured in the coolant flow direction being small relative to the maximum thickness, and then stamping at least one set of slots in the basic body in succession approximately in the longitudinal direction, each of the slots being associated with the longitudinal groove, leading approximately in the coolant flow direction through the basic body and having a sharp-edged mouth in each of the main sides being spaced apart from each of the groove walls in the groove bottom.

When only one conductor is provided according to the invention, in accordance with another mode of the invention, there is provided a method which comprises stamping each of the slots by piercing the basic body with a stamping tool from the groove bottom to the main side opposite it. In accordance with a further mode of the invention, there is provided a method which comprises forming the longitudinal groove by deep-drawing the basic body. In accordance with an added mode of the invention, there is provided a method which comprises forming the longitudinal groove by rolling the basic body. In accordance with an additional mode of the invention, there is provided a method which comprises forming the longitudinal groove by compression-molding the basic body. In accordance with again another mode of the invention, there is provided a method which comprises subjecting the basic body to a material-removing surface treatment, such as a blasting or sandblasting treatment, after the slots have been stamped in the basic body.

With the objects of the invention in view, there is additionally provided an electrical conductor of a winding for a dynamo-electric machine, comprising a basic body having a longitudinal direction and a coolant flow direction perpendicular to the longitudinal direction; the basic body having two substantially flat main sides oriented perpendicular to the coolant flow direction and having a maximum thickness in the coolant flow direction; the basic body having at least one set of slots formed therein in succession approximately in the longitudinal direction, each of the slots leading approximately in the coolant flow direction through the basic body and having a sharp-edged mouth in each of the main sides; and at least one of the main sides of the basic body having a longitudinal groove formed therein, being associated with the set of slots, being oriented approximately parallel to the longitudinal direction, defining two groove walls disposed approximately parallel to the coolant flow direction, defining a groove bottom disposed approximately perpendicular to the coolant flow direction and having a groove depth as measured in the coolant flow direction being small relative to the maximum thickness, and the mouth formed in the main side at each of the slots being spaced apart from each of the groove walls in the groove bottom.

Other features which are considered as characteristic for the invention are set forth in the appended claims.

Although the invention is illustrated and described herein as embodied in an electrical conductor with a longitudinal groove and slots perpendicular thereto and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
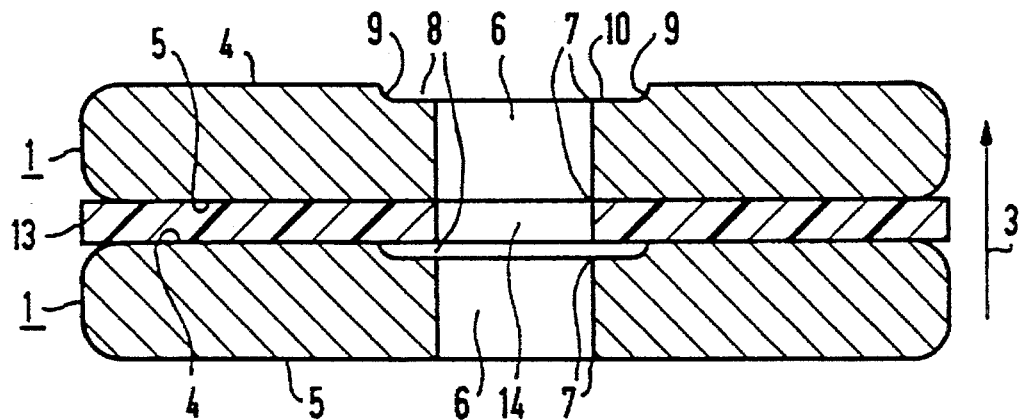
FIG. 1 is a diagrammatic, sectional view of a configuration of two electrical conductors according to the invention and one insulating layer.

Referring now in detail to the figures of the drawing, in which exemplary embodiments are shown partly diagrammatically, not to scale, and/or slightly distorted in order to clearly illustrate the special advantages of the invention, and first, particularly, to FIG. 1 thereof, there are seen two electrical conductors 1 according to the invention, which have been stacked along a coolant flow or stacking direction 3 with the interposition of an insulating layer 13. Each conductor 1 has a basic body with two main sides 4 and 5 that are oriented perpendicular to the stacking direction 3. Each first main side 4 is provided with a flat longitudinal groove 8, and each second main side 5 is substantially smooth. In order to pass a coolant gas through the electrical conductors 1 and the insulating layer 13, the conductors 1 have slots 6, the insulating layer 13 has a recess 14, and each slot 6 has a mouth 7 in each main side 4, 5.

The slots 6 and the recess 14 communicate, forming a coolant conduit through which a gaseous coolant can be blown in the stacking direction 3. Using the configuration shown in FIG. 1 to make an electrical winding for a dynamo-electric machine and the installation of such a winding in a winding carrier suiting the particular purpose is described in detail in the prior art cited, and especially in the aforementioned article by Lambrecht. The longitudinal groove 8 in the basic body of the electrical conductor 1 has two groove walls 9 oriented substantially parallel to the stacking direction 3 and a groove bottom 10 oriented substantially perpendicular to the stacking direction 3. In the specific case, although the groove walls 9 are rounded, which under some circumstances results automatically from the production mode chosen for the conductor 1, this does not stand in the way of their fundamental alignment with the stacking direction 3. The width of the longitudinal groove 8 between the groove walls 9 is dimensioned in such a way that each mouth 7 located in the first main side 4 is located entirely in the groove bottom 10. This makes it possible to increase a creep path available for an electrical creep current between two adjacent conductors 1 because, as can be seen from FIG. 1, a creep current need not take a path merely parallel to the stacking direction 3 through the recess 14 in the insulating layer 13 but instead must additionally take paths perpendicular to the stacking direction 3. For this reason lengthening of the creep path is also promoted by the fact that the recess 14 in the insulating layer 13 is constructed to be essentially congruent with a slot 6 in an adjacent conductor 1. The conductor 1 and the insulating layer 13 are disposed in such a way that resting on each insulating layer 13 is only one electrical conductor 1 with a main side 4 having a longitudinal groove 8. It has been found that the creep paths attainable in this way are adequately long. However, a longitudinal groove 8 on only one side 4 of each conductor 1 does assure an especially high cross section for conducting an electrical current, which is advantageous from the standpoint of the heat burden caused by the electrical current.

Figure 2:
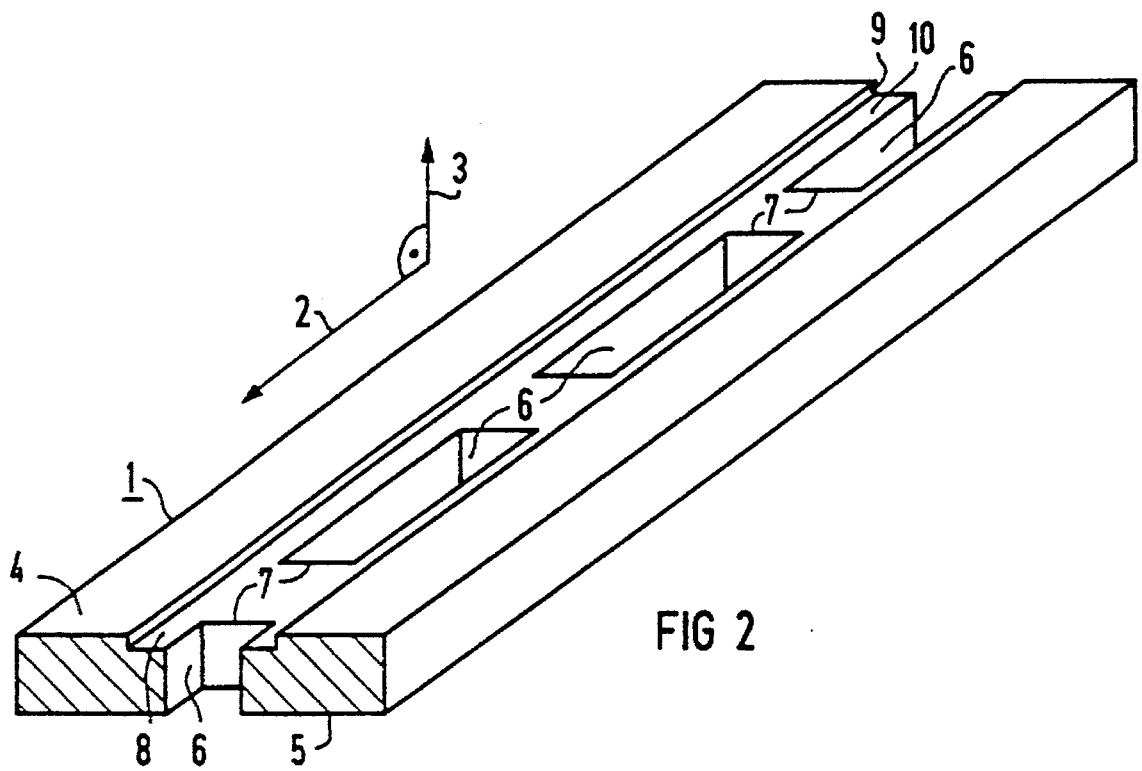
FIG. 2 is a perspective view of an exemplary embodiment of the conductor according to the invention.

FIG. 2 is a perspective view of a conductor 1 according to the invention. The basic body of the conductor 1 is elongated along a longitudinal direction 2 and has a set or multiplicity of slots 6, which pass through the conductor 1 parallel to the coolant flow or stacking direction 3 and each of which has a mouth 7 in each main side 4, 5. The first main side 4 of the conductor 1 has the flat longitudinal groove 8. The longitudinal groove 8 extends substantially over the entire length of the conductor 1 and can therefore already be made in the conductor 1 directly during the production of this conductor. In the example shown, the groove walls 9 are substantially parallel to the stacking direction 3, and the groove bottom 10 is orthogonal to the groove walls 9. As already noted, the specific embodiment of the longitudinal groove 8 can be adapted to the existing production capabilities. The only essential factor is that the longitudinal groove 8 have an adequate groove depth between the main side 4 and the groove bottom 10 for the sake of lengthening the creep path and to hold any burrs that might remain at the mouths 7. As already noted, the groove depth should be restricted to a sufficiently small size so that the cross section of the conductor 1 will not be reduced excessively.

Figure 3:
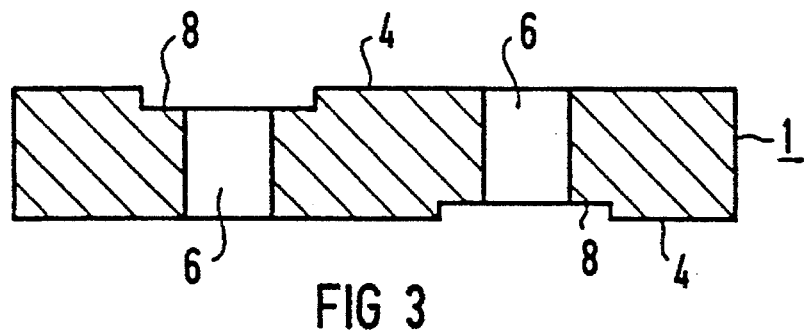
FIG. 3 is a cross-sectional view of a further exemplary embodiment of the invention.

FIG. 3 shows an exemplary embodiment of the conductor 1 according to the invention, in which two rows of slots 6, disposed one after the other in the non-illustrated longitudinal direction, are provided. Each row of slots 6 has one longitudinal groove 8 associated with it, so that the electrical conductor 1 has two longitudinal grooves 8. In the example shown, these longitudinal grooves 8 are distributed over both main sides 4.

Figure 4:
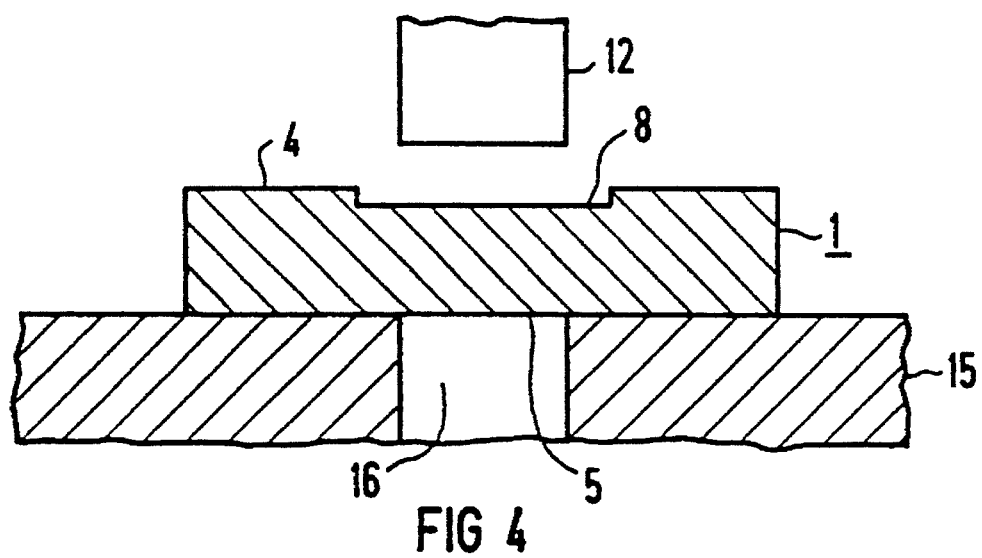
FIG. 4 is a cross-sectional view illustrating a process of stamping a slot into an electrical conductor.

FIG. 4 shows the way in which a conductor 1 can be stamped to form a slot. To that end, the conductor 1 is placed on a support 15, which has a suitable recess 16 for stamped-out pieces and for a stamping tool 12. The stamping process proceeds in such a way that the conductor 1 is pierced from the main side 4 that has the longitudinal groove 8 through to the substantially smooth main side 5 opposite it which rests on the support 15. The type of stamping shown in FIG. 4 is especially advantageous because sagging of the electrical conductor 1 in the stacking direction 3 (which is not shown in FIG. 4) is precluded. If the conductor 1 is pierced from the smooth main side 5 through to the longitudinal groove 8, then possible sagging must be prevented by means of a specially adapted support 15 or other provisions.

Figure 5:
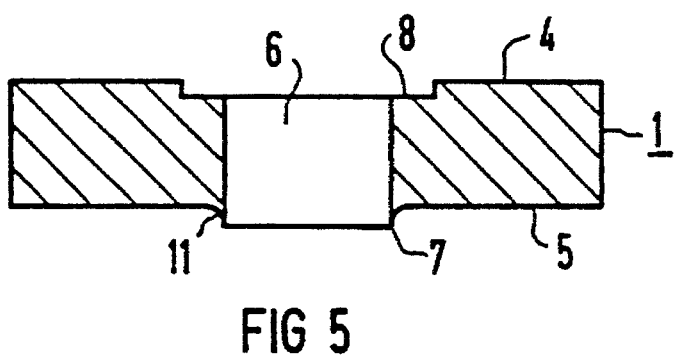
FIG. 5 is a cross-sectional view of the electrical conductor after the slot has been stamped.

FIG. 5 shows the product of the stamping process illustrated in FIG. 4. The conductor 1 has a slot 6 that is continuous from the longitudinal groove 8 to the smooth main side 5, and has a mouth 7 located in the smooth main side 5 on which a burr 11 is present, that results from the stamping process and is shown in exaggerated fashion in FIG. 5. As already noted, such a burr 11 can be maximally removed by simple retreatment of the conductor 1, such as by sandblasting. Any slight residue of the burr 11 that might possibly remain is not objectionable within the scope of the invention, unless the specific application, with a view to a requisite, especially high electrical strength, requires something different. If the electrical conductor 1 shown is stacked with a further conductor 1 (possibly with the interposition of an insulating layer) to form a winding, then any burr 11 that might possibly remain (or the insulating layer that is slightly deformed by it) will protrude into the longitudinal groove 8 of the adjacent conductor 1. This does not hinder the stackability of the conductor 1.

The invention relates to an electrical conductor having a basic body with a longitudinal direction and a coolant flow or stacking direction perpendicular to it, which can be stacked with a plurality of identical conductors, with the interposition of insulating layers in the stacking direction in an assembly and which has a set of slots for the passage of a coolant gas. The conductor can be produced simply and economically and in the context of the production process requires no expensive remachining after the slots have been made.

We claim:

1. An electrical conductor assembly, comprising:
   a) a plurality of identical conductors having a longitudinal direction and a stacking direction perpendicular to the longitudinal direction;
   b) at least one insulating layer to be inserted between each two respective conductors and stacked with said conductors in the stacking direction;
   c) each of said conductors having two substantially flat main sides oriented perpendicular to the stacking direction and having a maximum thickness in the stacking direction;
   d) each of said conductors having at least one set of slots formed therein in succession approximately in the longitudinal direction, each of said slots leading approximately in the stacking direction through a respective one of said conductors and having a sharp-edged mouth in each of said main sides; and
   e) at least one of said main sides of each of said conductors having a longitudinal groove formed therein, being associated with said set of slots, being oriented approximately parallel to the longitudinal direction, defining two groove walls disposed approximately parallel to the stacking direction, defining a groove bottom disposed approximately perpendicular to the stacking direction and having a groove depth as measured in the stacking direction being small relative to the maximum thickness, and said mouth formed in said main side at each of said slots being spaced apart from each of said groove walls in said groove bottom.

2. The electrical conductor assembly according to claim 1, wherein the groove depth is at most approximately 20% of the maximum thickness.

3. The electrical conductor assembly according to claim 1, wherein the groove depth is at most approximately 10% of the maximum thickness.

4. The electrical conductor assembly according to claim 1, wherein the groove depth is between 0.5 mm and 2 mm.

5. The electrical conductor assembly according to claim 1, wherein the groove depth is approximately 1 mm.

6. The electrical conductor assembly according to claim 1, wherein:
   a) each of said slots has a maximum slot width and each of said longitudinal grooves has a maximum groove width, perpendicular to the longitudinal direction and perpendicular to the stacking direction; and
   b) the maximum slot width is at most approximately 80% of the maximum groove width.

7. The electrical conductor assembly according to claim 1, wherein:
   a) each of said slots has a maximum slot width and each of said longitudinal grooves has a maximum groove width, perpendicular to the longitudinal direction and perpendicular to the stacking direction; and
   b) the maximum groove width is between 0.5 mm and 2 mm larger than the maximum slot width.

8. The electrical conductor assembly according to claim 1, wherein:
   a) each of said slots has a maximum slot width and each of said longitudinal grooves has a maximum groove width, perpendicular to the longitudinal direction and perpendicular to the stacking direction; and
   b) the maximum groove width is approximately 1 mm larger than the maximum slot width.

9. The electrical conductor assembly according to claim 1, wherein only one longitudinal groove is associated with each set of slots.

10. The electrical conductor assembly according to claim 1, wherein said at least one set of slots is only one set of slots.

11. The electrical conductor assembly according to claim 1, wherein said conductors have a maximum width being greater than the maximum thickness, perpendicular to the longitudinal direction and perpendicular to the stacking direction.

12. An electrical conductor winding for a dynamo-electric machine, comprising:
   a) a plurality of identical conductors having a longitudinal direction and a stacking direction perpendicular to the longitudinal direction;
   b) a plurality of insulating layers each having a set of recesses formed therein, each of said insulating layers being inserted between a respective two of said conductors and being stacked with said conductors in the stacking direction;
   c) each of said conductors having two substantially flat main sides oriented perpendicular to the stacking direction and having a maximum thickness in the stacking direction;
   d) each of said conductors having at least one set of slots formed therein in succession approximately in the longitudinal direction, each of said slots communicating with a respective one of said recesses, leading approximately in the stacking direction through a respective one of said conductors and having a sharp-edged mouth in each of said main sides; and
   e) at least one of said main sides of each of said conductors resting on one of said insulating layers having a longitudinal groove formed therein, being associated with said set of slots, being oriented approximately parallel to the longitudinal direction, defining two groove walls disposed approximately parallel to the stacking direction, defining a groove bottom disposed approximately perpendicular to the stacking direction and having a groove depth as measured in the stacking direction being small relative to the maximum thickness, and said mouth formed in said main side at each of said slots being spaced apart from each of said groove walls in said groove bottom.

13. The electrical conductor winding for a dynamoelectric machine according to claim 12, wherein said main side of only one of said conductors having said longitudinal grooves is placed on each respective one of said insulating layers.

14. The electrical conductor winding for a dynamoelectric machine according to claim 12, wherein each of said recesses in each of said insulating layers is substantially coincident with at least one of said slots with which it communicates.

15. An electrical conductor, comprising:
a) a basic body having a longitudinal direction and a coolant flow direction perpendicular to the longitudinal direction;
b) said basic body having two substantially flat main sides oriented perpendicular to the coolant flow direction and a maximum thickness in the coolant flow direction;
c) said basic body having at least one set of slots formed therein in succession approximately in the longitudinal direction, each of said slots leading approximately in the coolant flow direction through said basic body and having a sharp-edged mouth in each of said main sides; and
d) at least one of said main sides having a longitudinal groove formed therein, being associated with said set of slots, being oriented approximately parallel to the longitudinal direction, defining two groove walls disposed approximately parallel to the coolant flow direction, defining a groove bottom disposed approximately perpendicular to the coolant flow direction and having a groove depth as measured in the coolant flow direction being small relative to the maximum thickness, and said mouth formed in said main side at each of said slots being spaced apart from each of said groove walls in said groove bottom.

16. The electrical conductor according to claim 15, wherein the groove depth is at most approximately 20% of the maximum thickness.

17. The electrical conductor according to claim 15, wherein the groove depth is at most approximately 10% of the maximum thickness.

18. The electrical conductor according to claim 15, wherein the groove depth is between 0.5 mm and 2 mm.

19. The electrical conductor according to claim 15, wherein the groove depth is approximately 1 mm.

20. The electrical conductor according to claim 15, wherein:
a) each of said slots has a maximum slot width and each of said longitudinal grooves has a maximum groove width, perpendicular to the longitudinal direction and perpendicular to the coolant flow direction; and
b) the maximum slot width is at most approximately 80% of the maximum groove width.

21. The electrical conductor according to claim 15, wherein:
a) each of said slots has a maximum slot width and each of said longitudinal grooves has a maximum groove width, perpendicular to the longitudinal direction and perpendicular to the coolant flow direction; and
b) the maximum groove width is between 0.5 mm and 2 mm larger than the maximum slot width.

22. The electrical conductor according to claim 15, wherein:
a) each of said slots has a maximum slot width and each of said longitudinal grooves has a maximum groove width, perpendicular to the longitudinal direction and perpendicular to the coolant flow direction; and
b) the maximum groove width is approximately 1 mm larger than the maximum slot width.

23. The electrical conductor according to claim 15, wherein only one longitudinal groove is associated with each set of slots.

24. The electrical conductor according to claims 15, wherein said at least one set of slots is only one set of slots.

25. The electrical conductor according to claim 15, wherein said basic body has a maximum width being greater than the maximum thickness, perpendicular to the longitudinal direction and perpendicular to the coolant flow direction.

26. An electrical conductor of a winding for a dynamoelectric machine, comprising:
a) a basic body having a longitudinal direction and a coolant flow direction perpendicular to the longitudinal direction;
b) said basic body having two substantially flat main sides oriented perpendicular to the coolant flow direction and having a maximum thickness in the coolant flow direction;
c) said basic body having at least one set of slots formed therein in succession approximately in the longitudinal direction, each of said slots leading approximately in the coolant flow direction through said basic body and having a sharp-edged mouth in each of said main sides; and
d) at least one of said main sides of said basic body having a longitudinal groove formed therein, being associated with said set of slots, being oriented approximately parallel to the longitudinal direction, defining two groove walls disposed approximately parallel to the coolant flow direction, defining a groove bottom disposed approximately perpendicular to the coolant flow direction and having a groove depth as measured in the coolant flow direction being small relative to the maximum thickness, and said mouth formed in said main side at each of said slots being spaced apart from each of said groove walls in said groove bottom.

* * * * *